No. 757,715. PATENTED APR. 19, 1904.
J. W. AYLSWORTH.
PROPULSION OF ELECTRIC AUTOMOBILES.
APPLICATION FILED JUNE 24, 1903.
NO MODEL. 3 SHEETS—SHEET 1.
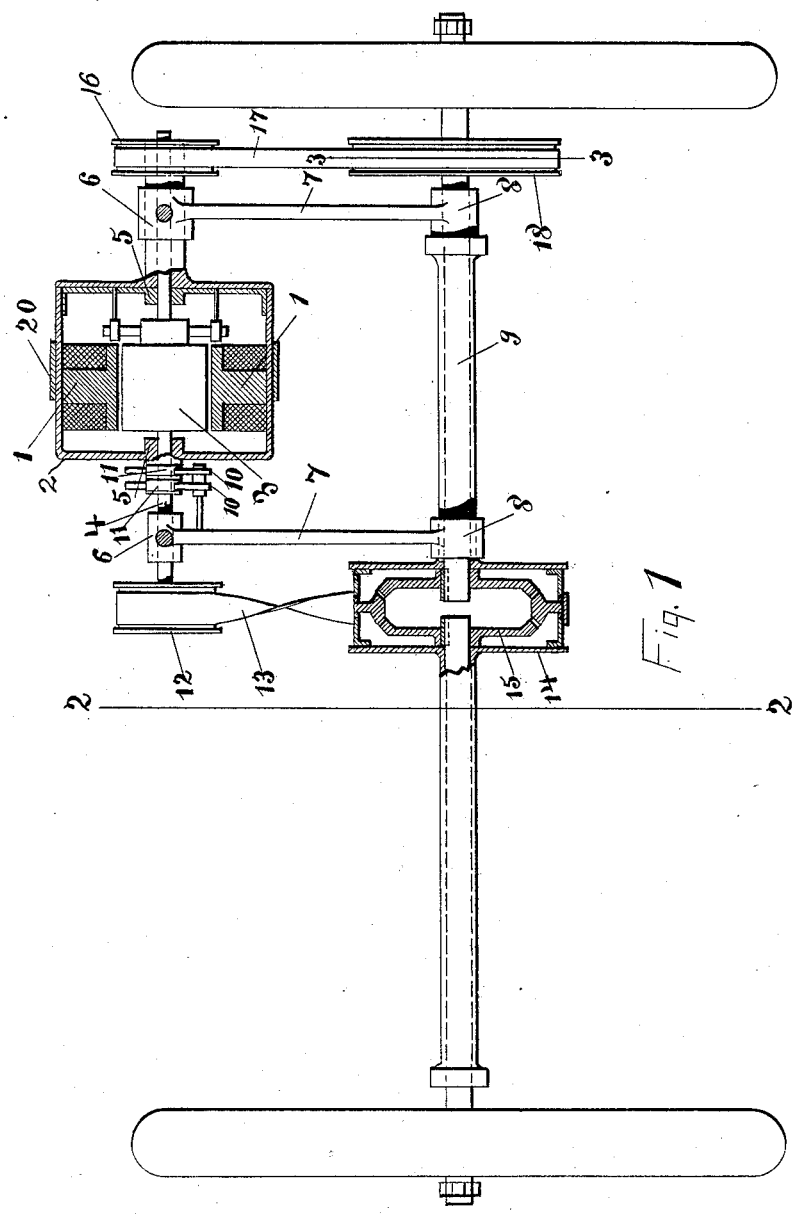
Witnesses:
P. R. Loveman.
J. F. Coleman
Inventor
Jonas W. Aylsworth
by Frank L. Dyer
Attorneys.

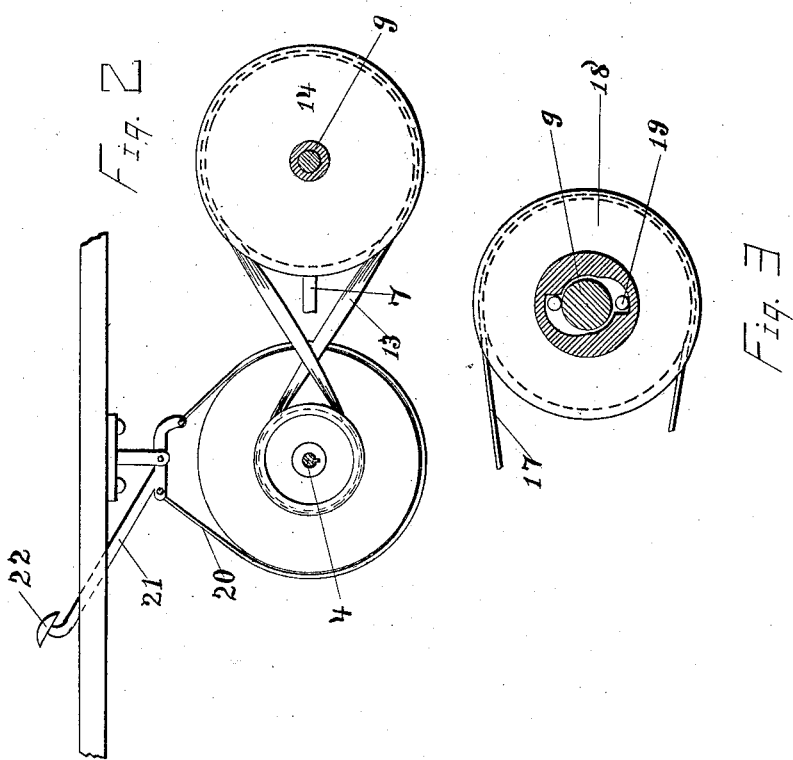

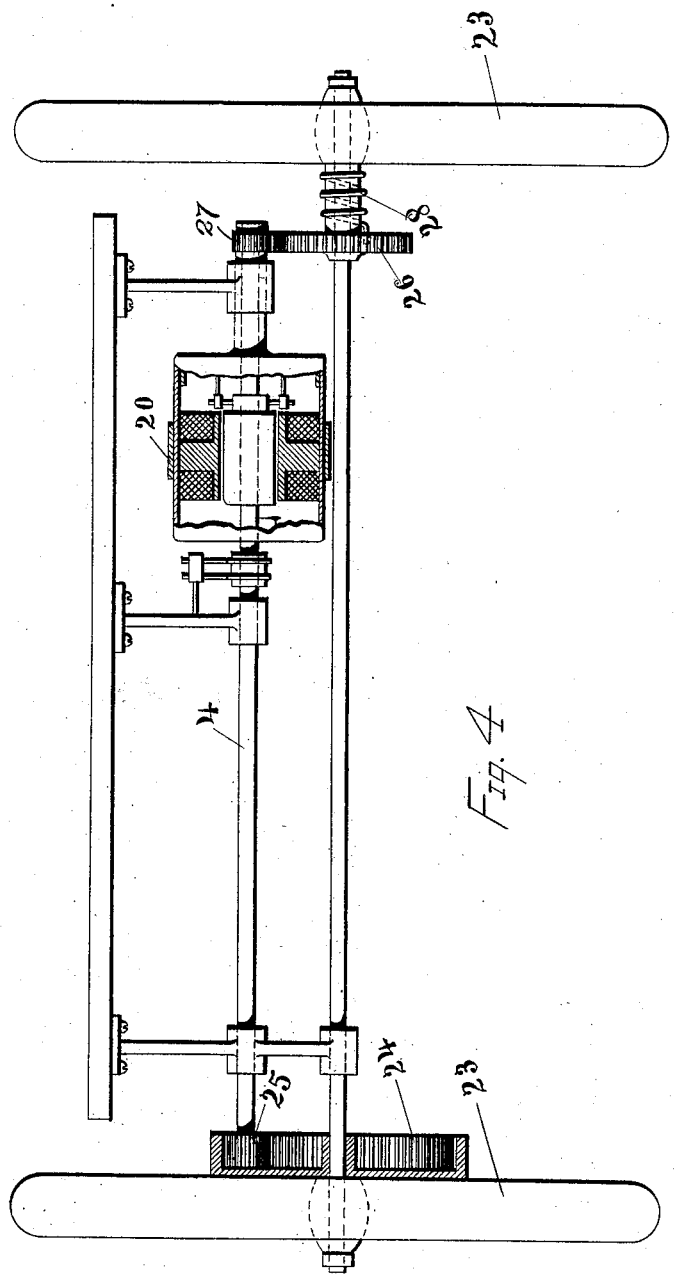

No. 757,715. Patented April 19, 1904.

UNITED STATES PATENT OFFICE.

JONAS W. AYLSWORTH, OF EAST ORANGE, NEW JERSEY.

PROPULSION OF ELECTRIC AUTOMOBILES.

SPECIFICATION forming part of Letters Patent No. 757,715, dated April 19, 1904.

Application filed June 24, 1903. Serial No. 162,973. (No model.)

*To all whom it may concern:*

Be it known that I, JONAS W. AYLSWORTH, residing at East Orange, in the county of Essex and State of New Jersey, have invented certain new and useful Improvements Relating to the Propulsion of Electric Vehicles, of which the following is a specification.

My invention relates to the propulsion of electric vehicles, and particularly electric automobiles employing storage batteries; and my object is to provide improved mechanism by means of which in a very simple manner the speed ratio between the motor and the driven wheels can be changed in order that the motor may operate at its normal speed when unusual loads are encountered.

With the usual arrangement of electric motors as now practiced in the art of propelling electric vehicles the encountering of a heavy overload results in a great reduction of armature speed, and in consequence a disproportionately large amount of current is consumed, which manifests itself as heat in the motor. This objection has been overcome to a certain extent in electric-railway work by the employment of motors designed to take the maximum load; but such an expedient is expensive and results in such a great increase in the weight of the cars as in many cases to necessitate a reconstruction of the road-bed. With automobiles, however, such an expedient is out of the question, and motors cannot be practically used which are designed for more than the average loads, so that in consequence with such vehicles frequently four times the normal current is consumed in the motor, much of which is dissipated in the form of heat. This uneconomical operation of electric motors in automobiles is very objectionable, not only on account of the expense and the necessary curtailment of the possible mileage, but also because of injury to the motor and in the case of lead batteries because of the injury to the same due to the resulting high discharge rate. I am aware, of course, that many suggestions have been made for interposing various arrangements of gears and analogous power-transmitting mechanical devices between the motor and the driven wheels in order that the speed relation between the two may be changed at will; but such prior expedients have been uncertain, expensive, cumbersome, and complicated, and have never gone into commercial use, so that at the present time the motors used are either very much overpowered or else when only designed for normal loads are subjected to injurious overloads.

I have invented an improved mechanism which is of an extremely simple character and by which the desired change in the speed relation between the motor and driven wheels can be secured at will.

In carrying my invention into effect I provide an electric motor, preferably of the iron-clad type and which is so arranged that the field and armature may be rotated in opposite directions. Under normal conditions power is transmitted from the motor to the driven wheels by the rotation of one of the motor elements, either the field or the armature, the other element being held stationary by a brake or other mechanical device. Under these conditions the motor will operate in the usual way and drives the driven wheels. When, however, the load is increased—as, for instance, on a considerable grade or in snow or mud—the motor element, which had before been held stationary, either the field or armature, is released and permitted to rotate in a direction opposite to that of the other element. By means of suitable power connections this reverse rotation of the now-released motor element is communicated to the driven wheels, so as to operate the same in the same direction, and the connections so used are of such a character as not to interfere with the proper normal operation of the device when one of the motor elements is stationary and the other rotates. This general scheme may obviously be carried out by many mechanical arrangements of driving mechanism, several forms of which will be presently referred to. It will be evident that when two motor elements are thus operatively connected with the driven wheels and are rotating in opposite directions and assuming the same speed relations between each of those elements and the driven wheels the effective speed of the latter for a given armature speed will be only half as great as when the driven wheels are operated by the rotation of one of the motor elements, the other element being stationary, all as I shall presently hereinafter describe and claim.

In order that the invention may be better understood, attention is directed to the accompanying drawings, forming a part of this specification, and in which—

Figure 1 is a sectional view through the motor and the live-axle of an electric vehicle, illustrating the employment of belts in driving the latter; Fig. 2, a sectional view on the line 2 2 of Fig. 1 looking toward the left; Fig. 3, a sectional view on the line 3 3 of Fig. 1 looking toward the right; and Fig. 4, a view corresponding to Fig. 1, illustrating the employment of gears for independently driving the two driven wheels.

In all of the above views corresponding parts are represented by the same numerals of reference.

Referring first to Figs. 1, 2, and 3, I show an iron-clad motor of a common type, having fields 1, carried within a cylindrical casing 2, and an armature 3, mounted on an armature-shaft 4. The casing 2 is provided with bearings 5, so that the said casing will be mounted on the armature-shaft and being capable of independent rotation thereon. The armature-shaft is supported in bearings 6 6, carried in any suitable way—as, for instance, by arms 7 7, formed with bearings 8 8, mounted on the live-axle 9. Current is supplied to the motor by means of brushes 10 10, engaging continuous collecting-rings 11 11. Keyed to the armature-shaft 4 is a pulley 12, which through a cross-belt 13 (see Fig. 2) drives a pulley 14 on the ordinary differential 15. The casing 2 is provided at its side with a pulley 16, which through a belt 17 (see Fig. 3) drives a pulley 18, connected to the axle 9 by mechanism which permits the latter to rotate when the pulley 18 is stationary and which rotates the axle when the said pulley is rotated. For this purpose roller-pawls 19 may be used, (see Fig. 3,) arranged like an ordinary bicycle coaster-brake; but obviously any other equivalent mechanical arrangement may be employed instead. In the specific example of the invention under consideration I arrange for the normal locking of the field against rotation, so that normally the driven wheels will be operated solely by the rotation of the armature. It will be obvious that the reverse arrangement may be employed and the armature normally locked from rotation, in which case the wheels will be driven by the rotation of the field-magnets. In the latter case, of course, the rotating field will be connected with the differential 15, and the normally stationary but rotatable armature will be connected to the axle by means of a suitable clutching mechanism, such as the roller-pawls 19. In the special instance under consideration the band-brake 20 surrounds the casing 2 and is adapted to normally hold the same against rotation. This band-brake is applied by a lever 21, operated by a pedal 22 within convenient reach of the operator.

Assuming the normal motor speed to be one thousand revolutions per minute, the operation will be as follows: The band-brake 21 holds the field-magnets from rotating, and the driven wheels will be operated by the rotation of the armature in the usual way. In this operation the speed of the motor will be controlled by the ordinary rheostat. At the normal speed, therefore, the armature will rotate at a speed of one thousand revolutions per minute, transmitting this rotation to the live-axle, which will therefore be revolved at a speed depending upon the ratio between the pulleys 12 and 14. In this operation the pulleys 16 and 18 will be stationary; but the shaft 9 will be free to turn relatively to the latter pulley by reason of the releasable clutch connection between the same. When increased power is necessary, as when an overload is encountered, the band 20 is released, which permits the field to rotate oppositely to the armature and at the same speed, provided, of course, the same ratio exists between the pulleys 16 and 18 as between the pulleys 12 and 14. Consequently the axle 9 will be equally driven by the two motor elements; but since these elements rotate in opposite directions the effect is the same as if the armature speed has been reduced one-half. In this way I am enabled to reduce the axle speed to any desired extent without altering the speed of the armature with respect to the field-magnets and the consequent efficiency of the motor. If it is desired to secure an intermediate speed, this can be accomplished either by interposing resistance in the motor-circuit or by altering the battery connection or by gradually applying the brake 20 so as to check the rotation of the field-magnets, which are finally brought to rest, whereupon the high-speed relation will once again be established.

In Fig. 4 I illustrate two vehicle-wheels 23, one carrying an internally-toothed gear 24, with which a pinion 25 on the armature-shaft 4 is in mesh, and the other carrying an ordinary spur-gear 26, which engages a pinion 27 on the field-casing 2. In order to provide for a releasable clutch connection between the field-casing and its driven wheel when the former rotates and at the same time to permit said driven wheel to turn when the field-casing is stationary, I show a spring 28, connected to the spur-gear 26 and on the wheel-hub and arranged to grip the same when the gear is rotated. On the other hand, when the field-casing is stationary the rotation of the driven wheel tends to uncoil the spring, so as to relax its grip, whereby the spring acts like a friction-pawl. The use of such a coiled spring permits a simple and very efficient construction to be secured. The operation of this modification will be readily understood. Normally the field-casing is stationary, and the power of the motor is applied to one of the driven wheels through the pinion 25 and gear 24. When, however, increased power is desired, the field-casing is released, whereupon it rotates in the opposite direction, communicating this motion to the other driven wheel through the pinion 27 and gear 26. I prefer the arrangement first described or its equivalent, since with that arrangement the two wheels will be simultaneously driven at all times; but the arrangement shown in Fig. 4 may in some instances be advantageously employed, since it is simple, permits the use of a fixed rear axle, and does away with the necessity of a differential.

An important advantage in my improved apparatus, aside from its capacity to permit a change in the speed ratio between the motor and the driven wheels to be secured, resides in the fact that when the cylindrical field-casing is released and the two elements are thus driven in opposite directions by the vehicle in descending a grade a sufficient relatively high speed of the armature is secured to overcome the electromotive force of the batteries, whereby the motor will be thus converted into a generator, so as to return energy to the batteries and at the same time produce a braking effect. With ordinary arrangements this is not possible unless the vehicle is permitted to coast at a dangerously high speed. It will be seen that when the apparatus is operating at low speed the field-casing 2 acts practically as a fly-wheel, so as to give a very smooth and easy operation.

Having now described my invention, what I claim therein, and desire to secure by Letters Patent, is as follows:

1. In apparatus of the class described, the combination of an electric motor having a rotatable armature part and a rotatable field part, means for normally locking one of said parts from rotation, a pair of driven wheels, connections between the two rotatable motor parts and said wheels, and a releasable clutch in the connection from the normally stationary member, substantially as and for the purposes set forth.

2. In apparatus of the class described, the combination with an electric motor whose field-magnets and armature are independently rotatable in opposite directions, of a pair of driven wheels, connections between said rotatable elements and said wheels, a releasable clutch in one of said connections, and means for locking against rotation, the rotatable element connected with said clutch, substantially as and for the purposes set forth.

3. In an apparatus of the class described, the combination with an electric motor whose armature and field-magnets are independently rotatable in opposite directions, of a driven shaft, connections between said shaft and said rotatable elements, for driving the shaft in a single direction, a releasable clutch in one of said connections and means for locking against rotation the rotatable element connected with said clutch, substantially as and for the purposes set forth.

4. In apparatus of the class described, the combination with an iron-clad electric motor whose field-magnets and armature are capable of independent rotation in opposite directions, of a driven shaft, connections between said armature and driven shaft, reverse connections between the field and driven shaft, a releasable clutch in said reverse connections, and means for locking said field from rotation, substantially as set forth.

This specification signed and witnessed this 15th day of June, 1903.

JONAS W. AYLSWORTH.

Witnesses:
 FRANK L. DYER,
 LEE R. LOVEMAN.